United States Patent
Sumiya

(10) Patent No.: US 10,167,169 B2
(45) Date of Patent: Jan. 1, 2019

(54) REEL, METHOD OF MANUFACTURING THE SAME, AND METHOD OF MANUFACTURING REEL COMPONENT MEMBER

(71) Applicant: FUJIFILM CORPORATION, Minato-ku, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 303 days.

(21) Appl. No.: 15/018,865

(22) Filed: Feb. 9, 2016

(65) Prior Publication Data

US 2016/0284378 A1 Sep. 29, 2016

(30) Foreign Application Priority Data

Mar. 27, 2015 (JP) ................... 2015-066197

(51) Int. Cl.
*B65H 75/14* (2006.01)
*B65H 75/50* (2006.01)
(Continued)

(52) U.S. Cl.
CPC ............ *B65H 75/14* (2013.01); *B65H 75/50* (2013.01); *G11B 23/044* (2013.01);
(Continued)

(58) Field of Classification Search
CPC .................. B65H 75/14; B65H 75/50; B65H 2701/5122; G11B 23/113; G11B 23/107; G11B 23/044
See application file for complete search history.

(56) References Cited

U.S. PATENT DOCUMENTS 5,707,025 A    1/1998   Schmidt et al.
6,349,015 B1*  2/2002   Hayashi ........... G11B 23/08728
                                                    360/132
(Continued)

FOREIGN PATENT DOCUMENTS

JP    H04-353683 A    12/1992
JP    3037962 U        6/1997
(Continued)

OTHER PUBLICATIONS

English language translation of the following: Office action dated Jul. 18, 2017 from the JPO in a Japanese patent application No. 2015-066197 corresponding to the instant patent application. This office action translation is submitted now in order to supplement the understanding of the cited reference which is being disclosed in the instant Information Disclosure Statement.

*Primary Examiner* — William A. Rivera
(74) *Attorney, Agent, or Firm* — Solaris Intellectual Property Group, PLLC

(57) ABSTRACT

A reel comprises a bottomed circular tube shaped hub that has an outer peripheral face for winding a recording tape around; a first flange that is integrally molded to one end portion of the hub; a second flange that is joined to another end portion of the hub; a plurality of hole portions that are provided at equal intervals on a ring shaped reel gear formed at a lower face of a bottom plate of the hub; and a gate mark that is formed at the bottom plate of the hub, further to a radial direction inside than an inner peripheral face of the hub, wherein a difference in surface roughness between a weld portion and a non-weld portion on the outer peripheral face of the hub is 0.25 μm or less.

6 Claims, 12 Drawing Sheets

(51) Int. Cl.
    *G11B 23/04*   (2006.01)
    *G11B 23/107*  (2006.01)
    *G11B 23/113*  (2006.01)
(52) U.S. Cl.
    CPC .......... *G11B 23/107* (2013.01); *G11B 23/113*
                    (2013.01); *B65H 2701/5122* (2013.01)

(56) References Cited

U.S. PATENT DOCUMENTS

| | | | | |
|---|---|---|---|---|
| 8,807,472 | B2 * | 8/2014 | Suzuki | B65H 19/28 |
| | | | | 242/332.3 |
| 2002/0175239 | A1 * | 11/2002 | Momoi | G11B 23/107 |
| | | | | 242/348 |
| 2006/0151570 | A1 * | 7/2006 | Shinkawa | B06B 3/02 |
| | | | | 228/1.1 |
| 2007/0262190 | A1 * | 11/2007 | Kubota | G11B 23/113 |
| | | | | 242/532.3 |
| 2009/0057463 | A1 | 3/2009 | Sumiya et al. | |
| 2009/0224091 | A1 * | 9/2009 | Ishikawa | B65H 75/14 |
| | | | | 242/348 |
| 2010/0230526 | A1 | 9/2010 | Suzuki | |

FOREIGN PATENT DOCUMENTS

| | | |
|---|---|---|
| JP | 2003-30952 A | 1/2003 |
| JP | 2009-064506 A | 3/2009 |
| JP | 2010-215327 A | 9/2010 |

* cited by examiner

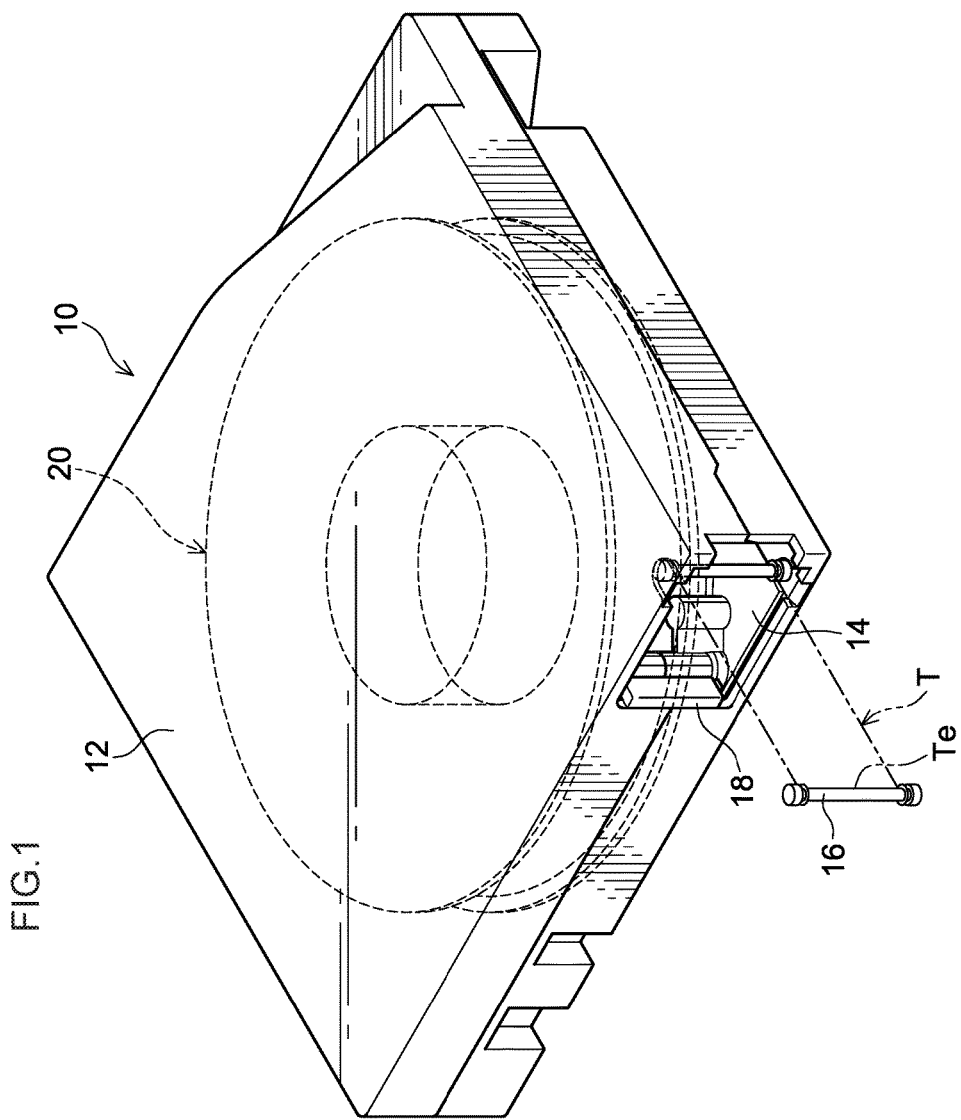

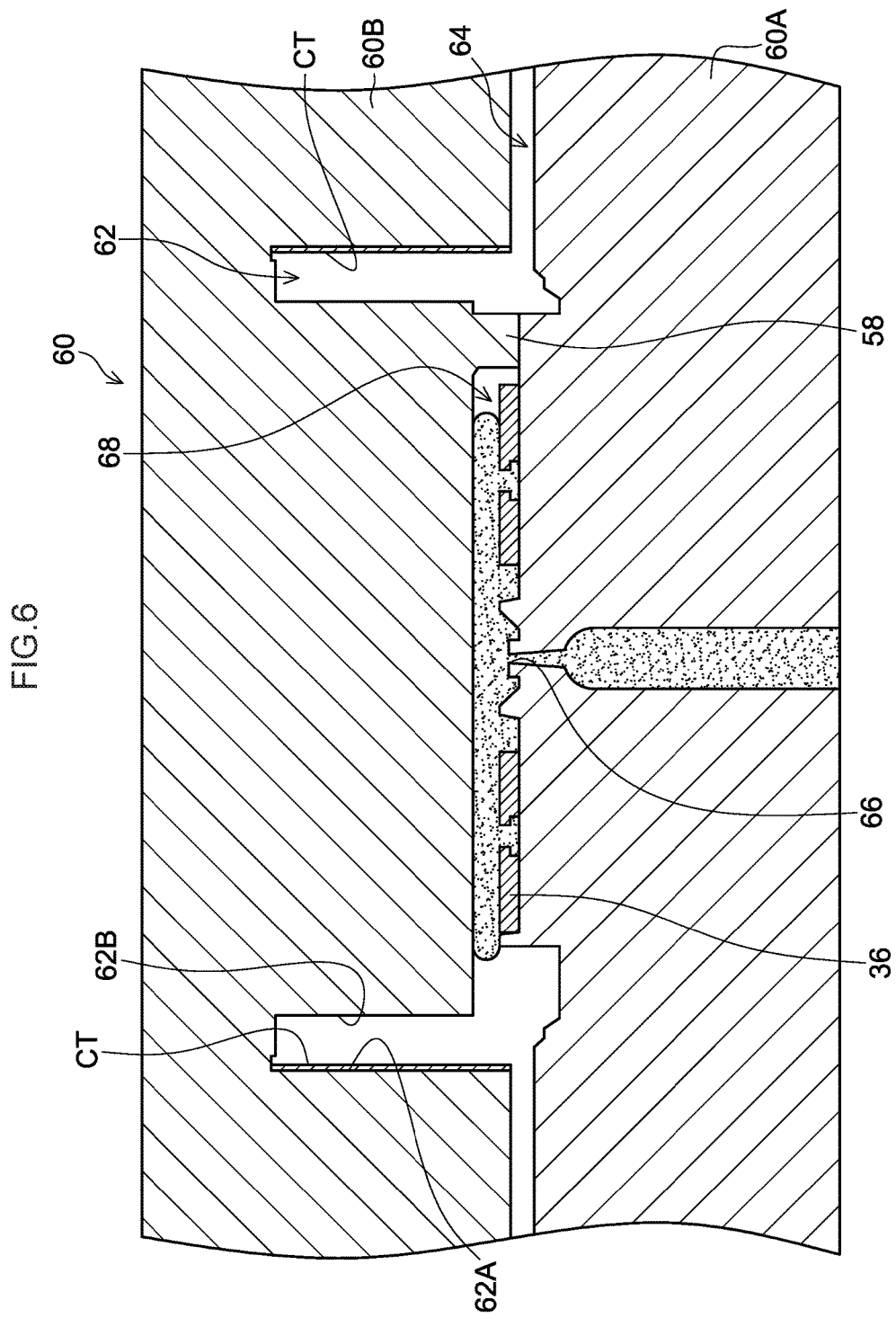

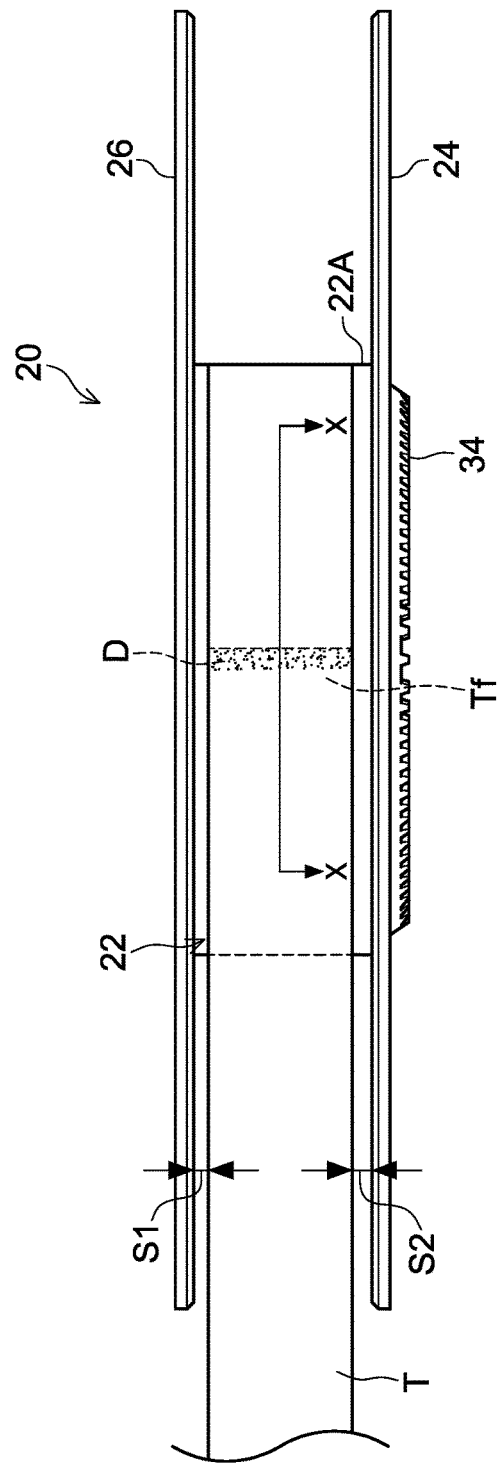

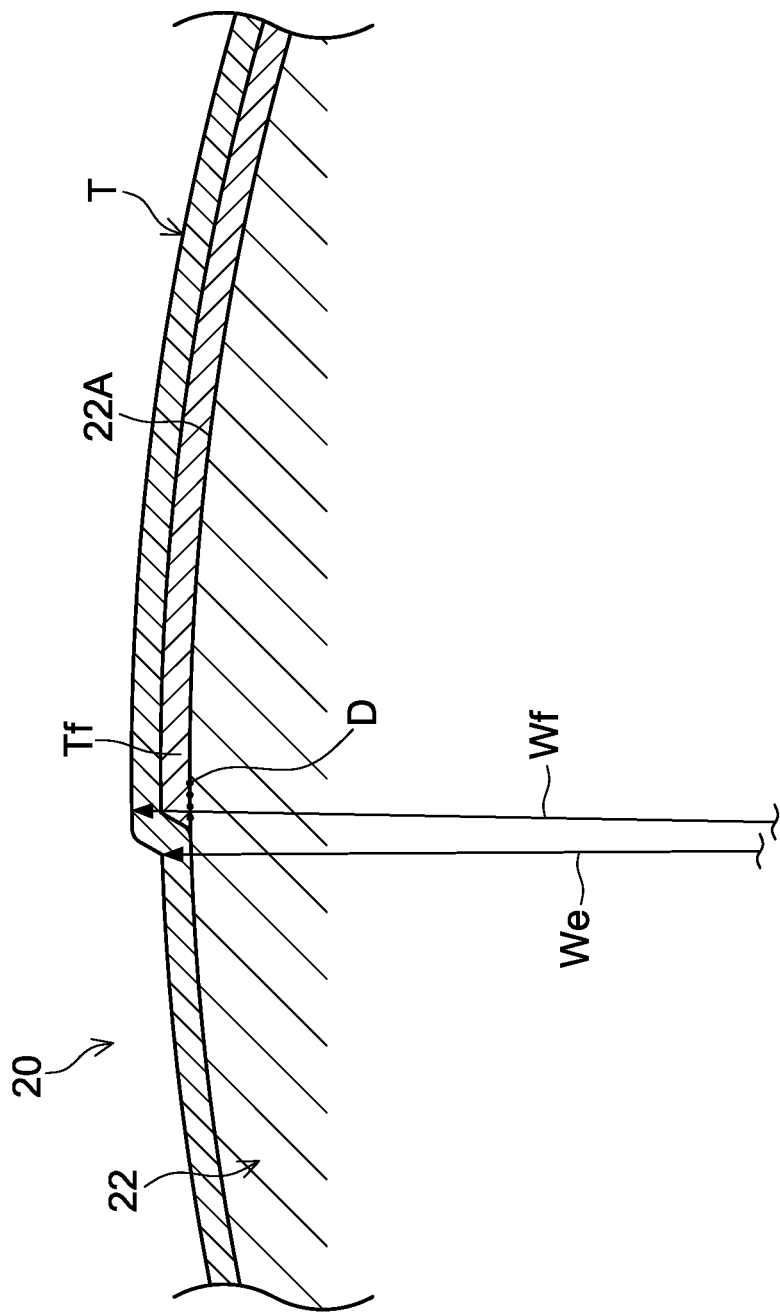

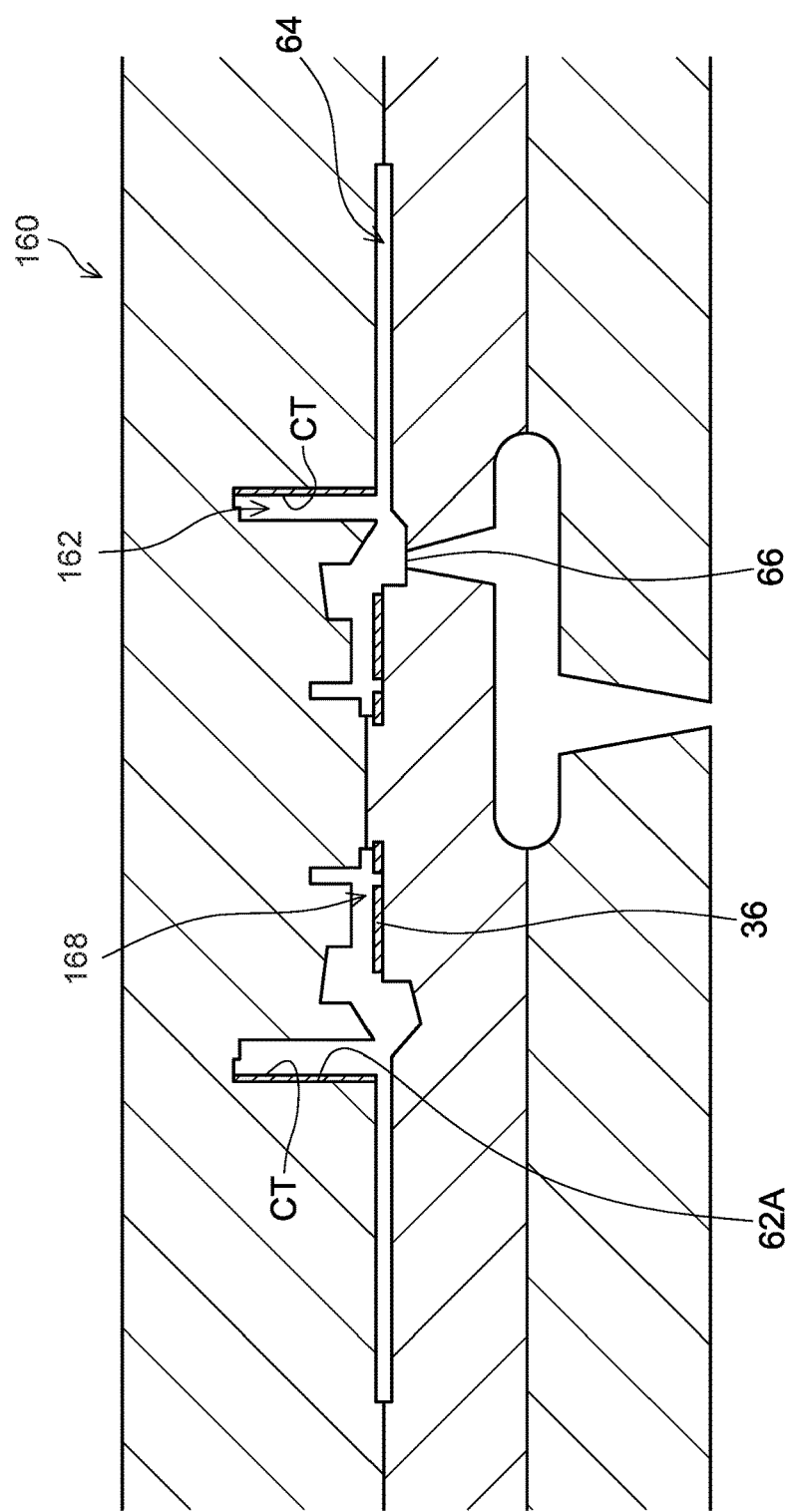

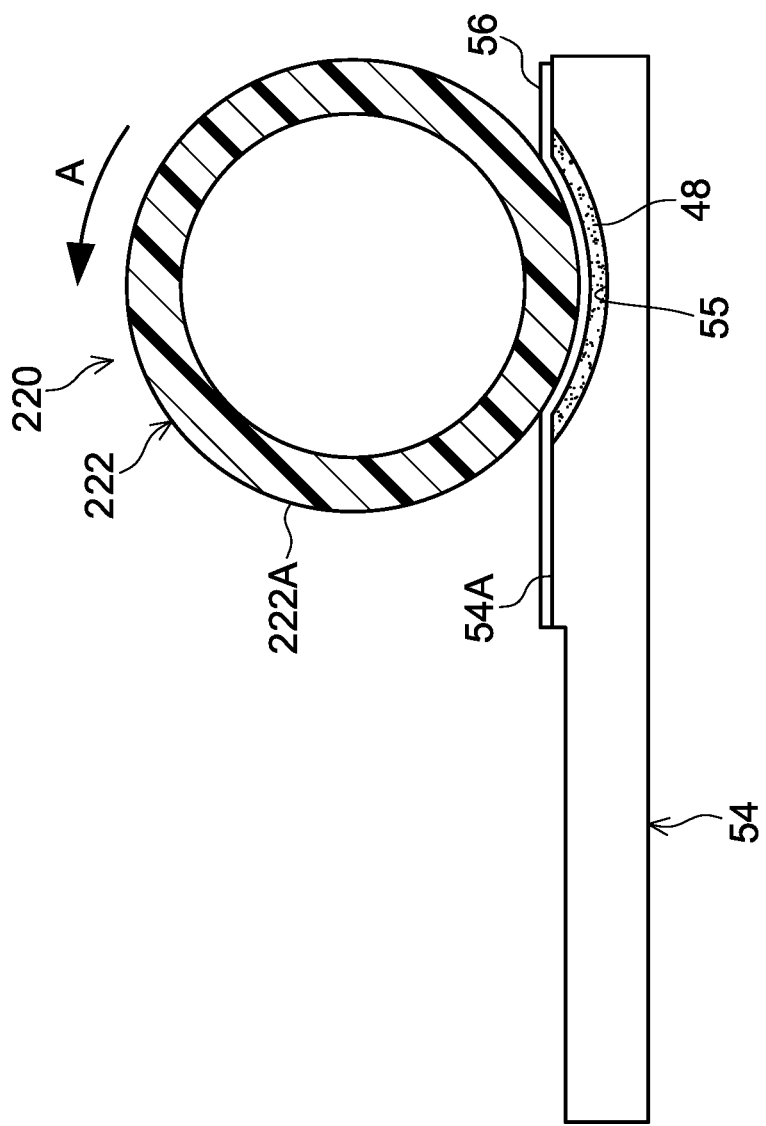

REEL, METHOD OF MANUFACTURING THE SAME, AND METHOD OF MANUFACTURING REEL COMPONENT MEMBER

CROSS-REFERENCE TO RELATED APPLICATION

This application claims priority under 35 USC 119 from Japanese Patent Application No. 2015-066197 filed Mar. 27, 2015, the disclosure of which is incorporated by reference herein.

BACKGROUND OF THE INVENTION

Technical Field

Preferred embodiments relate to a reel, a method of manufacturing a reel, and a method of manufacturing a reel component member.

Related Art

Conventional tape cartridges are known in which a single reel, with a recording tape such as magnetic tape wound around an outer peripheral face of a hub, is housed inside a case. Conventional reels of such tape cartridges are also known in which a center line average roughness Ra of the outer peripheral face of the hub is stipulated to be from 0.005 µm to 0.04 µm (see, for example, Japanese Patent Application Laid-Open (JP-A) No. 2003-30952).

Conventional winding methods are also known in which a free end portion of the recording tape is caused to make sliding-contact with the outer peripheral face of the hub, and the free end portion of the recording tape adheres to the outer peripheral face of the hub due to abraded powder that is generated as a result (see, for example, JP-A No. 2010-215327).

SUMMARY

However, in a case that reels are molded by a mold in which a gate as an injection inlet for melted resin material is, for example, disposed at a location that corresponds to a center portion of a bottom plate of the hub, three hole portions are sometimes formed at equal intervals around a circumferential direction at the bottom plate further to a radial direction inside than an inner peripheral face of the hub.

In such cases, the melted resin material that has been injected through the gate is divided by portions of the mold that form the hole portions, flows toward the radial direction outside, and converges at a portion of the mold that forms the hub.

Weld lines along the axial direction are therefore liable to be formed at an outer peripheral face of the hub positioned at the radial direction outside of the hole portions (see FIG. 7). A phenomenon is also seen in which portions of the mold facing the weld lines degrade over time. The cause of this phenomenon is thought to be as described below. Namely, when molding using the mold, corrosive gas generated by the melted resin flows in a manner similar to that of the melted resin, and so is liable to concentrate at portions formed by the weld lines (hereafter referred to as "weld portions"), and portions of the mold facing the weld lines sometimes corrode over time due to this corrosive gas.

When part of the mold corrodes, surface figure of the corroded portion is transferred to the outer peripheral face of the reel hub, such that the weld portions have a rougher surface than portions where the weld lines are not formed (hereafter referred to as "non-weld portions"). Thus, when the free end portion of the recording tape is caused to make sliding-contact with the outer peripheral face of the hub, in order to be adhered thereto, more abraded powder than required is generated at the weld portions.

In particular, recording tapes have become even thinner in recent years, such that, when the recording tape, with the free end portion adhered to the outer peripheral face of the hub, is wound around for a first turn, a second turn, a third turn, and so on, a step (creasing) of a thickness of the recording tape or greater, that cannot be ignored, occurs in the recording tape from the second turn onward superimposed on the free end portion, due to abraded powder interposed between the free end portion and the outer peripheral face of the hub.

In a case that a step is generated in the recording tape that has been wound around the hub, when the recording tape is run while rotating the reel for a specific number of rotations, and the recording tape is recorded on or played back by a recording and playback head of a drive device, the behavior of the recording tape at the portion where the step has been generated changes suddenly, such that there is a concern that a recording defect or a playback defect (hereafter referred to as "drop-out") occurs.

An object of preferred embodiments is to obtain a reel, a method of manufacturing the same, and a method of manufacturing a reel component member capable of suppressing drop-out from occurring when recording on or playing back a recording tape using a recording and playback head.

A reel of a first aspect according to the disclosures includes a bottomed circular tube shaped hub that has an outer peripheral face for winding a recording tape around, a first flange that is integrally molded to one end portion of the hub, a second flange that is joined to another end portion of the hub, plural hole portions that are provided at equal intervals on a ring shaped reel gear formed at a lower face of a bottom plate of the hub, and a gate mark that is formed at the bottom plate of the hub, further to a radial direction inside than an inner peripheral face of the hub, wherein a difference in surface roughness between a weld portion and a non-weld portion on the outer peripheral face of the hub is 0.25 µm or less.

A reel of a second aspect according to the disclosures includes a bottomed circular tube shaped hub that has an outer peripheral face for winding a recording tape around, a first flange that is integrally molded to one end portion of the hub, a second flange that is joined to another end portion of the hub, and plural gate marks that are formed at equal intervals in a circumferential direction at a bottom plate of the hub, further to a radial direction inside than an inner peripheral face of the hub, wherein a difference in surface roughness between a weld portion and a non-weld portion on the outer peripheral face of the hub is 0.25 µm or less.

In a method of manufacturing a reel component member of a third aspect according to the disclosures, the reel component member includes a bottomed circular tube shaped hub that has an outer peripheral face for winding a recording tape around, a flange that is integrally provided at one end portion of the hub, and plural hole portions that are provided at equal intervals on a ring shaped reel gear formed at a lower face of a bottom plate of the hub. The method of manufacturing the reel component member includes injecting a melted resin material into a mold through a gate disposed in the mold further to a radial direction inside than a wall face for forming an inner peripheral face of the hub and molding the reel component member, and after removing the reel component member from the mold, abrading the outer peripheral face of the hub so that a difference in surface roughness between a weld portion and a non-weld portion is 0.25 μm or less.

In a method of manufacturing a reel component member of a fourth aspect according to the disclosures, the reel component member includes a bottomed circular tube shaped hub that has an outer peripheral face for winding a recording tape around, and a flange that is integrally provided at one end portion of the hub. The method of manufacturing the reel component member includes injecting a melted resin material into a mold through plural gates disposed in the mold at equal intervals in a circumferential direction further to a radial direction inside than a wall face for forming an inner peripheral face of the hub and molding the reel component member, and after removing the reel component member from the mold, abrading the outer peripheral face of the hub so that a difference in surface roughness between a weld portion and a non-weld portion is 0.25 μm or less.

A method of manufacturing a reel of a fifth aspect according to the disclosures includes, in the reel component member that is manufactured by the above-described method of manufacturing a reel component member, joining a flange, opposed to the flange, at another end portion of the hub.

The disclosures are capable of suppressing drop-out from occurring when recording on or playing back a recording tape using a recording and playback head.

BRIEF DESCRIPTION OF THE DRAWINGS

Embodiments of the present invention will be described in detail based on the following figures, wherein:

FIG. 1 is a perspective view of a recording tape cartridge;

FIG. 6 is an enlarged cross-section illustrating a mold for molding a reel component member of a reel according to the first exemplary embodiment;

FIG. 8 is a side view illustrating a state in which one turn of a recording tape has been wound around a reel hub of a reel according to the first exemplary embodiment;

FIG. 9 is a cross-section taken along an arrow line X-X in FIG. 8;

FIG. 11 is a cross-section illustrating a mold for molding a reel component member of a reel according to the second exemplary embodiment; and FIG. 12 is an explanatory view illustrating an abrader for abrading an outer peripheral face of a reel hub of a reel according to a third exemplary embodiment.

DETAILED DESCRIPTION OF THE INVENTION

Figure 2A:
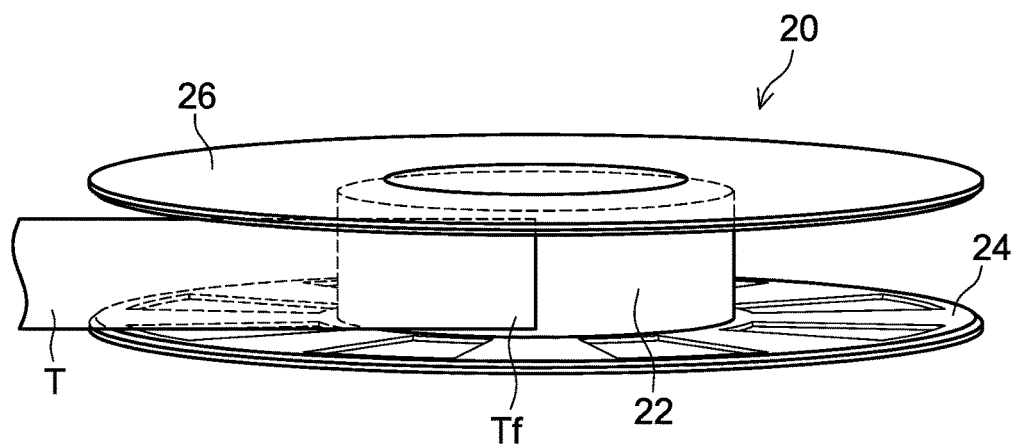
FIG. 2A is a perspective view of when a recording tape starts winding around a reel.

Detailed explanation follows regarding exemplary embodiments based on the drawings. First, brief explanation follows regarding a recording tape cartridge 10 that houses a single reel 20, and then explanation follows regarding the reel 20. Note that when a recording tape T is wound onto the reel 20 according to the present exemplary embodiments, the winding is performed by a winding method described in JP-A No. 2010-215327.

As illustrated in FIG. 1, the recording tape cartridge 10 includes a case 12 made of a resin such as polycarbonate (PC). The case 12 is formed in a substantially rectangular box shape, and the single reel 20 made of a resin such as polycarbonate (PC) is housed alone so as to be capable of rotating at the inside of the case 12.

An opening 14 for pulling out the recording tape T that has been wound onto the reel 20 is formed at a side wall of the case 12. A leader pin 16, which is anchored and pull-operated by a pulling member (not illustrated in the drawings) of a drive device (not illustrated in the drawings), is fixed to a free end portion Te of the recording tape T that is pulled out from the opening 14.

The opening 14 is opened and closed by a door 18. The door 18 is formed in a substantially rectangular plate shape of a size capable of closing the opening 14, and is biased in a direction that closes the opening 14 by a biasing member (not illustrated in the drawings). The door 18 is opened against the biasing force of the biasing member as the recording tape cartridge 10 is mounted onto the drive device.

First Exemplary Embodiment

Figure 3:
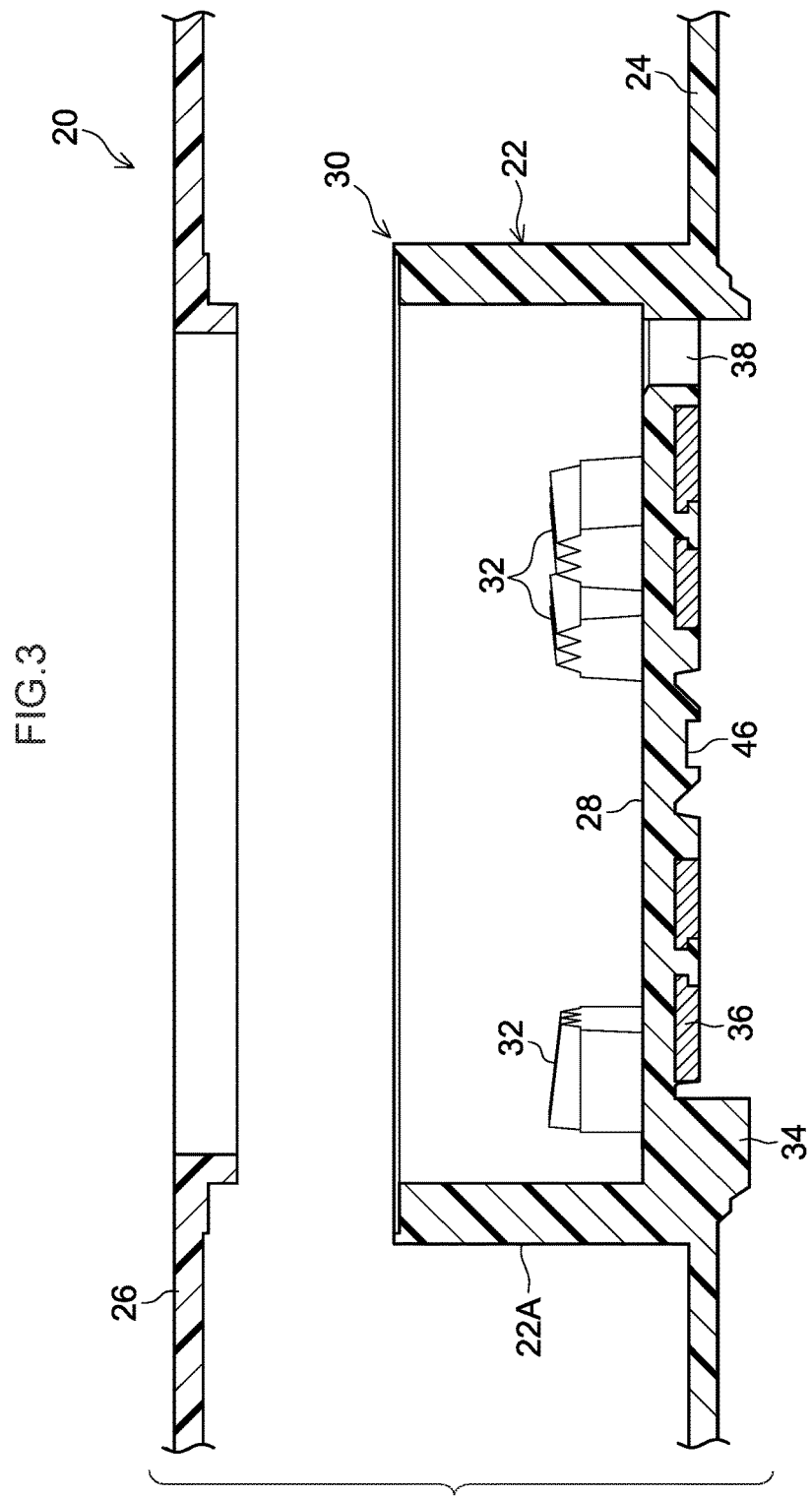
FIG. 3 is an exploded side cross-section illustrating a reel component member and an upper flange of a reel according to a first exemplary embodiment.

Explanation follows regarding the reel 20 according to a first exemplary embodiment. As illustrated in FIG. 2A and FIG. 3, the reel 20 is configured by a circular tube shaped reel hub 22 that configures an axial center portion, a lower flange 24 serving as a flange that is integrally provided at a lower end portion of the reel hub 22, an upper flange 26 serving as a flange that is provided at and joined to an upper end portion of the reel hub 22, and a bottom plate 28 that is integrally provided so as to close the lower end portion of the reel hub 22.

Note that a reel component member 30 of the present exemplary embodiment is configured by the reel hub 22, the lower flange 24, and the bottom plate 28. The recording tape T, which is a magnetic tape or the like serving as an information recording and playback medium, is wound around an outer peripheral face 22A of the reel hub 22, and width direction end portions of the wound recording tape T are protected by the lower flange 24 and the upper flange 26 (see FIG. 2B).

Figure 4A:
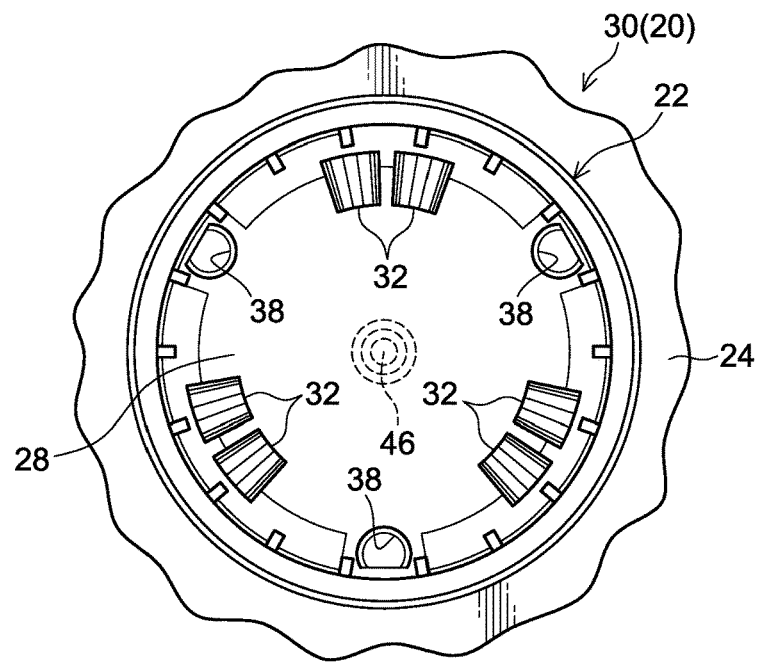
FIG. 4A is a plan view illustrating a configuration of a reel hub of a reel according to the first exemplary embodiment.

As illustrated in FIG. 3 and FIG. 4A, three engagement gears 32 are formed at equal intervals around a circumferential direction at an upper face of the bottom plate 28 further to a radial direction inside than an inner peripheral face of the reel hub 22. When the recording tape cartridge 10 is not mounted to the drive device and is not in use, the engagement gears 32 mesh with brake gears of a brake member (not illustrated in the drawings) that is incapable of rotating with respect to the case 12.

Figure 4B:
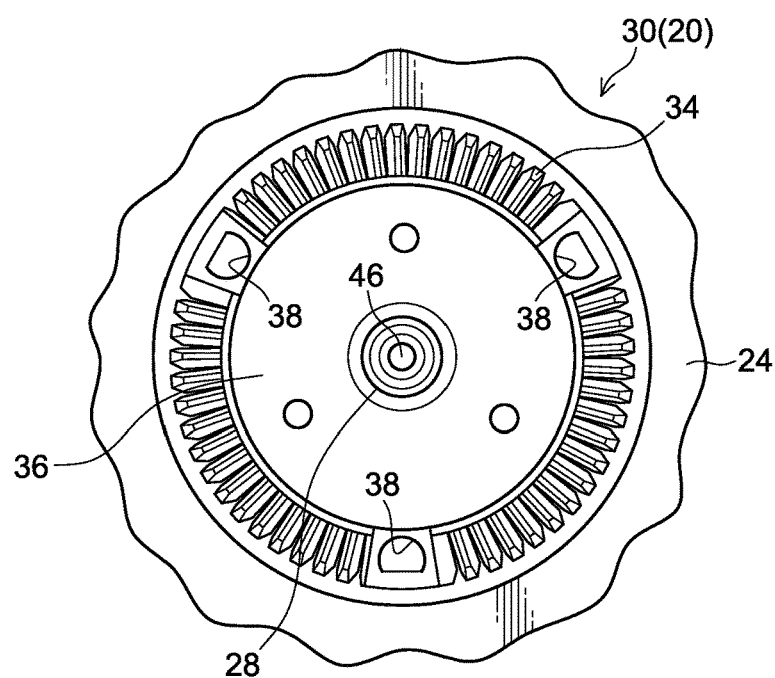
FIG. 4B is a bottom view illustrating a configuration of a reel hub of a reel according to the first exemplary embodiment.

As illustrated in FIG. 3 and FIG. 4B, a reel gear 34 is formed in a ring shape at a lower face of the bottom plate 28 further to the radial direction inside than the inner peripheral face of the reel hub 22. A ring shaped reel plate 36 formed of a magnetic material is integrally fixed by insert molding or the like to the lower face of the bottom plate 28, further to the radial direction inside than the reel gear 34.

Three hole portions 38 are formed at equal intervals on the reel gear 34. The three hole portions 38 are inserted with leg portions of a release member (not illustrated in the drawings) provided inside the reel hub 22 in order to release the braking of the reel 20 by the brake member. A gate mark 46 is formed further to the radial direction inside than the reel plate 36, at a center portion of the bottom plate 28 (the axial center of the reel 20) in this example.

A gear opening (not illustrated in the drawings) to expose the reel gear 34 and the reel plate 36 to the outside is formed in substantially a center portion of a lower wall of the case 12. The reel gear 34 that is exposed through the gear opening is enmeshed with a drive gear (not illustrated in the drawings) formed at a rotary shaft (not illustrated in the drawings) of the drive device.

The enmeshing operation with the rotary shaft presses the leg portions of the release member toward the axial direction upper side, the release member presses the brake member upward toward the axial direction upper side, and releases the enmeshing of the brake gears with the engagement gears 32, such that braking on the reel 20 is released. The reel 20 which has been released from braking rotates inside the case 12 due to the rotary shaft being rotation-driven.

Winding Method

Figure 5A:
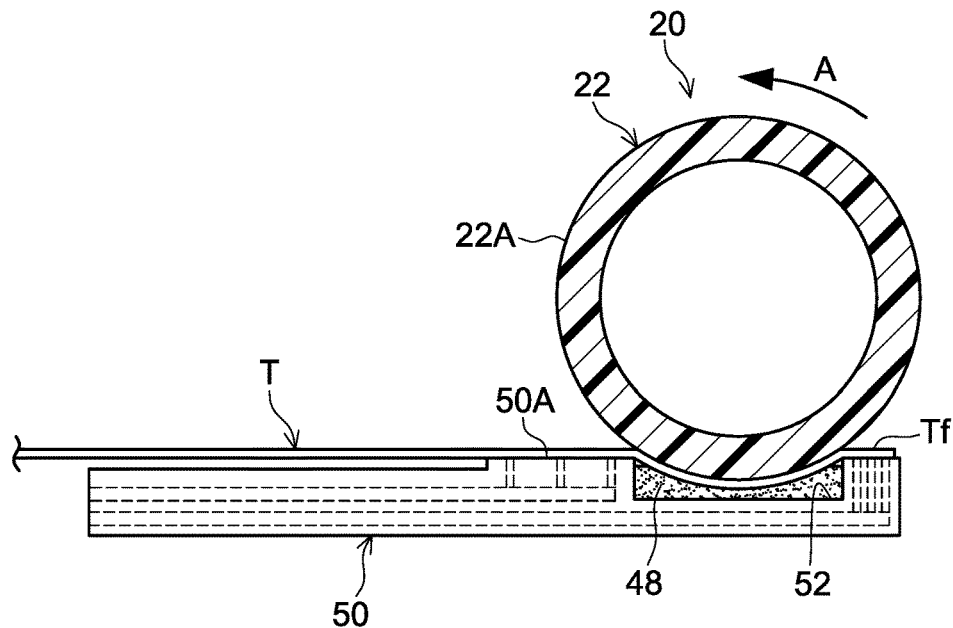
FIG. 5A is an explanatory view illustrating a state in which a recording tape retained by a retaining mechanism of a winding device has been pressed against a reel hub.
Figure 5B:
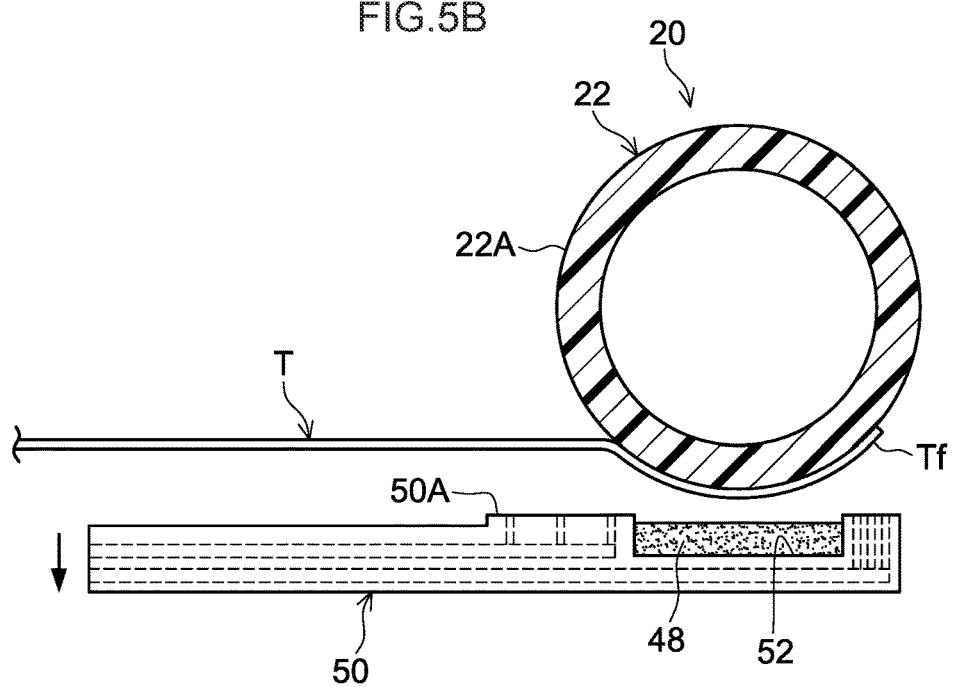
FIG. 5B is an explanatory view illustrating a state in which a retaining mechanism that has adhered a recording tape to a reel hub is separated from the reel hub.

Explanation follows regarding a winding method in which the recording tape T is adhered to and wound around the outer peripheral face 22A of the reel hub 22 in the reel 20 configured as described above, without being coated with a liquid for adhering. Note that FIG. 5A and FIG. 5B are plan view cross-sections illustrating only the reel hub 22 of the reel 20, in order to simplify the explanation of the drawings. A resilient body 48, described later, is configured by a sponge form material that has an appropriate hardness (such as hardness of 22 using a measuring method based on the Society of Rubber Industry, Japan Standard (SRIS) 0101).

As illustrated in FIG. 5A, the reel 20 is set on a rotary drive gear (not illustrated in the drawings) of a winding device. Namely, the reel gear 34 of the reel 20 is enmeshed with the rotary drive gear. Note that the reel plate 36 is attracted to a magnet (not illustrated in the drawings) provided at the radial direction inside of the rotary drive gear when this is performed.

A free end portion Tf, forming the opposite side of the recording tape T to the free end portion Te that is attached to the leader pin 16, is retained by air suction to an upper face 50A of a retaining mechanism 50 of the winding device. The resilient body 48 provided in a recessed portion 52 of the retaining mechanism 50 then presses the outer peripheral face 22A of the reel hub 22, with the free end portion Tf interposed therebetween.

Namely, the free end portion Tf of the recording tape T that is present on top of the resilient body 48 is caused to contact the outer peripheral face 22A of the reel hub 22 with a specific pressure. The reel hub 22 is then rotated for several seconds at a specific speed (such as 300 rpm) in the arrow A direction illustrated in FIG. 5A, and the outer peripheral face 22A of the reel hub 22 is caused to make sliding-contact with the recording tape T for a specific distance or more (such as 2000 mm or more). As illustrated in FIG. 5B, the free end portion Tf of the recording tape T adheres to the outer peripheral face 22A of the reel hub 22 when this is performed.

Note that adhesion force of the recording tape T is determined by a surface roughness Ra (nm) of a non-magnetic face, this being the contact face of the recording tape T (hereafter referred to as "back face Tb") contacting the outer peripheral face 22A of the reel hub 22, and the contact duration. Namely, in cases of a smooth face with Ra<approximately 5 nm, in which the surface roughness Ra of the back face Tb of the recording tape T is low, there is a large friction force against the outer peripheral face 22A of the reel hub 22, such that there is a large adhesion force (adhesion is easy). In such cases, the recording tape T thereby adheres to the reel hub 22 (outer peripheral face 22A), even if the contact duration (contact distance) thereto is short.

However, in cases of a rough face with Ra≥approximately 5 nm, in which the surface roughness Ra of the back face Tb of the recording tape T is high, there is a small friction force against the outer peripheral face 22A of the reel hub 22, such that there is a low adhesion force (adhesion is difficult). In such cases, the contact duration (contact distance) of the reel hub 22 (outer peripheral face 22A) against the recording tape T is thereby lengthened to increase the adhesion force. When the contact duration (contact distance) is lengthened, abraded powder D is generated at the back face Tb of the free end portion Tf (see FIG. 8, FIG. 9), and it is thought that the adhesion force against the reel hub 22 (outer peripheral face 22A) is increased by this abraded powder D.

Brief explanation regarding this mechanism follows below. An oxide film is formed at the outer peripheral face 22A of the reel hub 22. Thus, when the back face Tb of the recording tape T and the outer peripheral face 22A of the reel hub 22 (the oxide film) rub against each other in a pressed-together state, part of the oxide film is stripped away, and fine protrusions on the back face Tb are ground down. The abraded powder D is generated, and the abraded powder D adheres to the outer peripheral face 22A of the reel hub 22.

The abraded powder D is spread due to the sliding-contact of the reel hub 22 against the recording tape T, such that the bonding force of the abraded powder D is increased. In particular, surface energy rises at the outer peripheral face 22A where the oxide film has been stripped off, and the bonding force of the abraded powder D is increased. The abraded powder D with increased bonding force accordingly performs the role of an adhesive, thereby obtaining adhesion force of the recording tape T (free end portion Tf) against the outer peripheral face 22A of the reel hub 22.

Moreover, due to fine protrusions on the back face Tb of the recording tape T being ground down, the back face Tb is closer to being a smooth face, such that the friction force against the outer peripheral face 22A of the reel hub 22 is also increased. Thus, even in a recording tape T that has high surface roughness Ra (a rough face) of the back face Tb, adhesion force of the free end portion Tf against the outer peripheral face 22A of the reel hub 22 is increased, and the free end portion Tf adheres to the outer peripheral face 22A of the reel hub 22.

The free end portion Tf of the recording tape T is adhered to the outer peripheral face 22A of the reel hub 22 by the above mechanism, without using any liquid for adhering recording tapes, such as alcohol. Note that, when the free end portion Tf of the recording tape T has adhered to the outer peripheral face 22A of the reel hub 22, the air suction by the retaining mechanism 50 is released, and as illustrated in FIG. 5B, the retaining mechanism 50 is separated from the reel hub 22.

The rotary drive gear of the rotation mechanism is then rotated at a lower speed (such as 60 rpm) than the rotation speed during the above-described sliding-contact, while a specific tensile force (such as approximately 0.01N in cases in which the thickness of the recording tape T is 5.2 μm) is applied to the recording tape T. When a specific amount of the recording tape T has been wound around the reel hub 22, the rotary drive gear is then rotated at a high speed, and the recording tape T is sequentially wound onto the reel hub 22.

Figure 2B:
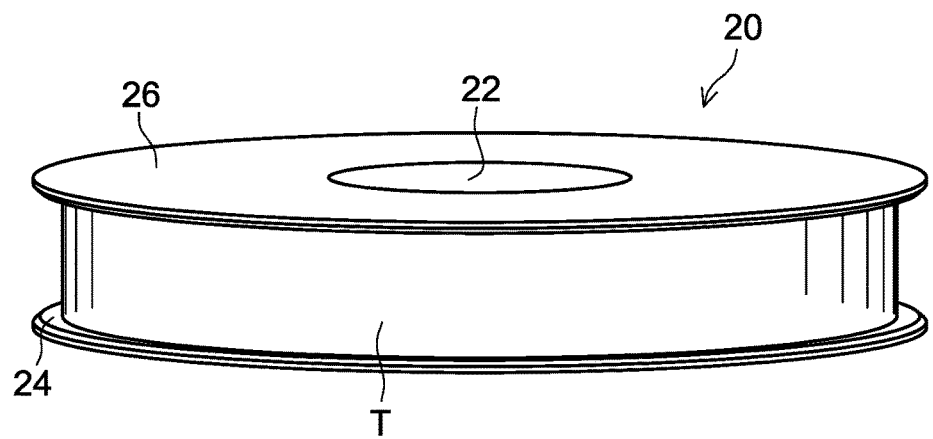
FIG. 2B is a perspective view of when a recording tape has finished winding around a reel.

As illustrated in FIG. 2A and FIG. 2B, the reel 20 is thereby ultimately in a state with the recording tape T wound thereon. Note that, as illustrated in FIG. 8, when this winding method is employed, adhesion may be performed in a state in which specific gaps S1, S2 are respectively formed between edges of the recording tape T, and the lower flange 24 and the upper flange 26 (the recording tape T does not slope toward the lower flange 24 side or the upper flange 26 side).

Mold

Next, explanation follows regarding a mold 60 that integrally molds the reel hub 22, the lower flange 24, and the bottom plate 28 of the reel 20, namely, regarding configuration and operation of the mold 60 that molds the reel component member 30.

As illustrated in FIG. 6, the mold 60 includes a fixed side mold 60A and a movable side mold 60B, and a space for molding the reel component member 30 (respective formation portions, described later) by abutting the movable side mold 60B against the fixed side mold 60A. Explanation follows regarding the respective formation portions that form the reel component member 30.

The mold 60 is manufactured by steel or the like, and includes a hub formation portion 62 for forming the reel hub 22, a flange formation portion 64 for forming the lower flange 24, and a bottom plate formation portion 68 for forming the bottom plate 28. An anticorrosion coating CT is applied to a wall face 62A of the hub formation portion 62 that forms the outer peripheral face 22A of the reel hub 22.

A gate 66 for injecting melted resin material such as PC into the mold 60 is disposed further to the radial direction inside than a wall face 62B of the hub formation portion 62 that forms the inner peripheral face of the reel hub 22, and is disposed at a center portion of the bottom plate formation portion 68 (the axial center of the reel 20) in this example. Thus, when melted resin material is injected through the gate 66, the resin material flows from the bottom plate formation portion 68 toward the hub formation portion 62 and the flange formation portion 64.

Figure 7:
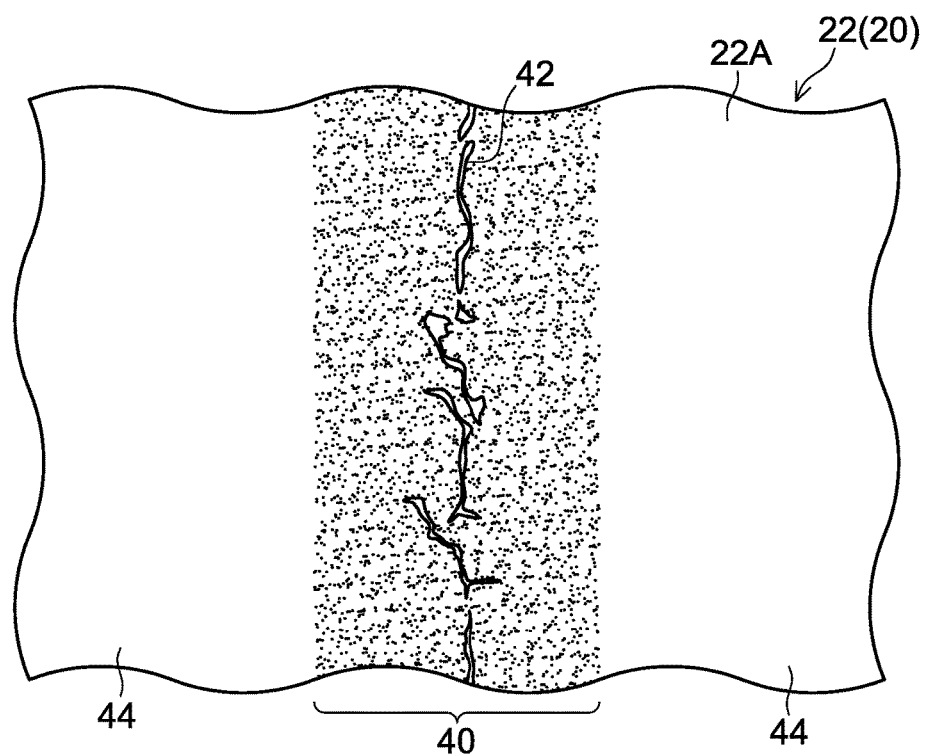
FIG. 7 is an enlarged side view illustrating a weld portion at an outer peripheral face of a reel hub of a reel component member that has been molded by a mold that is not coated with an anticorrosion coating.

Note that the three hole portions 38 are formed in the bottom plate 28 at equal intervals around the circumferential direction. Three column portions 58 are therefore provided at the bottom plate formation portion 68 at equal intervals around the circumferential direction. The resin material flowing from the bottom plate formation portion 68 toward the hub formation portion 62 side is temporarily divided by the respective column portions 58, and then converges inside the hub formation portion 62. As illustrated in FIG. 7, a weld line 42 that runs substantially along the axial direction is accordingly formed at the outer peripheral face 22A of the reel hub 22 at the radial direction outside of each hole portion 38 formed by the respective column portion 58.

During molding using the mold 60, corrosive gas is generated from the melted resin material. The corrosive gas flows in a similar manner to that of the melted resin material, and so is liable to concentrate at convergence portions of the resin material inside the hub formation portion 62. Thus, in cases in which the anticorrosion coating CT is not applied to the wall face 62A of the hub formation portion 62, it is conceivable that parts of the wall face 62A (locations facing the weld lines 42) corrode over time due to the corrosive gas, and that rough figure of these parts of the wall face 62A is transferred to the outer peripheral face 22A of the reel hub 22. Weld portions 40 including the weld lines 42 are thereby formed at equal intervals on three locations at the outer peripheral face 22A of the reel hub 22 (see FIG. 7).

Note that the recording tape T is wound onto the outer peripheral face 22A of the reel hub 22 using the above-described winding method; however, the surface is rougher at the weld portions 40 than at non-weld portions 44 that locates between each weld portion 40 and weld portion 40. Thus more abraded powder D than required is liable to be generated by the weld portions 40. Moreover, the recording tape T has a thickness of 5.5 μm or less (5.2 μm in the present exemplary embodiment) and 1000 m or more is wound around the reel 20, and there is a trend in the future that recording tapes will become even thinner.

Thus, as illustrated in FIG. 8 and FIG. 9, when the free end portion Tf of the recording tape T is adhered to the outer peripheral face 22A of the reel hub 22 by the abraded powder D, and a winding start portion of a second turn of the recording tape T is superimposed on and wound around the free end portion Tf of a first turn of the recording tape T with the abraded powder D interposed between the recording tape T and the outer peripheral face 22A, a step that has a thickness of the recording tape T or greater occurs at the winding start portion of the second turn of the recording tape T due to the abraded powder D, such that creasing is liable to occur in the recording tape T sequentially superimposed on the winding start portion.

In the event that creasing occurs in the recording tape T, when the recording tape T has been run while rotating the reel 20 for a specific number of rotations, and the recording tape T has been recorded on or played back by a recording and playback head (not illustrated in the drawings) of the drive device, the behavior of the recording tape T at the portion where the creasing has occurred changes suddenly, such that there is a concern a recording defect or a playback defect, namely, of drop-out occurring by the recording and playback head.

Note that, in the present exemplary embodiment as described above, in order to reduce the surface roughness Ra of the weld portions 40, the anticorrosion coating CT is applied to the wall face 62A of the hub formation portion 62 that forms the outer peripheral face 22A of the reel hub 22. Specifically, a chromium nitride-based coating, or a diamond-like carbon (DLC) coating, for example, is applied to the wall face 62A.

This enables the wall face 62A of the hub formation portion 62 of the mold 60 to be suppressed or prevented from corroding over time during molding, thereby enabling the surface roughness Ra of the weld portions 40 including the weld lines 42 at the outer peripheral face 22A of the reel hub 22 to be reduced. Specifically, a difference between the surface roughness Ra of the weld portions 40 and the surface roughness Ra of the non-weld portions 44 can be reduced to 0.25 μm or less.

Thus, in the winding method in which the free end portion Tf of the recording tape T is wound on after being caused to make sliding-contact with and adhere to the outer peripheral face 22A of the reel hub 22, when the recording tape T is being wound around the outer peripheral face 22A of the reel hub 22, generation of more abraded powder D than required can be suppressed, and the step occurring due to the recording tape T being wound around can be reduced.

Specifically, obviously in cases of joining without employing the abraded powder D, but even in cases of joining employing the abraded powder D as illustrated in FIG. 9, a difference in winding radii We, Wf across the entire width of the recording tape T between a winding terminal end of the first turn and a winding start end of the second turn of the recording tape T that has been wound around the outer peripheral face 22A of the reel hub 22 is 1.3 times the thickness of the recording tape T, or less. Creasing can be suppressed or prevented from occurring on the recording tape T within this range, and drop-out can be suppressed or prevented from occurring. Moreover, since the degree to how much creasing occurs can be predicted, control that suppresses or prevents the occurrence of drop-out is possible.

Note that the anticorrosion coating CT is only applied to the wall face 62A of the hub formation portion 62. Namely, the anticorrosion coating CT is not applied to respective wall faces of the bottom plate formation portion 68 or the flange formation portion 64, which respectively mold the bottom plate 28 and the lower flange 24 which demand dimensional accuracy.

The surface roughness Ra and winding radius in the present exemplary embodiment is measured by a contour/form measuring system CV-3000CNC (manufactured by Mitutoyo Corporation). In the case of winding radius, for example, the surface of the recording tape T from the vicinity of the winding terminal end of the first turn to the vicinity of the winding start end of the second turn is scanned around the circumferential direction of the reel hub 22 at appropriate locations along the axial direction of the reel hub 22, and the difference in radii is derived from the acquired contour curve.

Second Exemplary Embodiment

Explanation follows regarding a reel 120 according to a second exemplary embodiment. Note that similar locations to the first exemplary embodiment are appended with the same reference numerals, and detailed explanation thereof including common operation is omitted as appropriate.

Figure 10A:
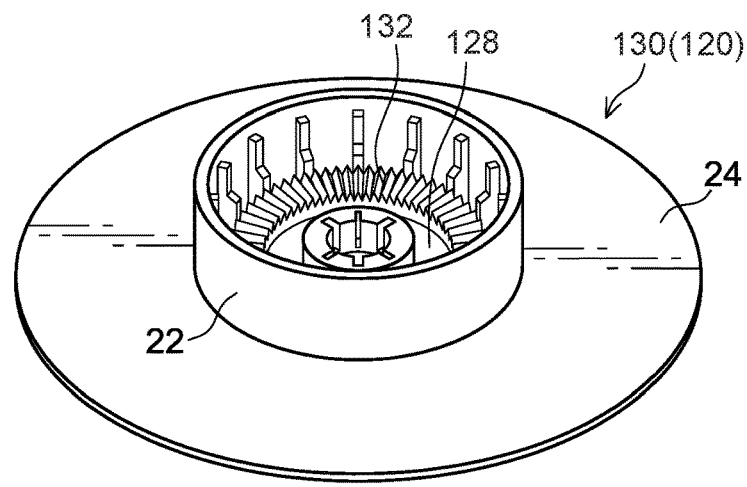
FIG. 10A is a perspective view illustrating a reel component member of a reel according to a second exemplary embodiment.
Figure 10B:
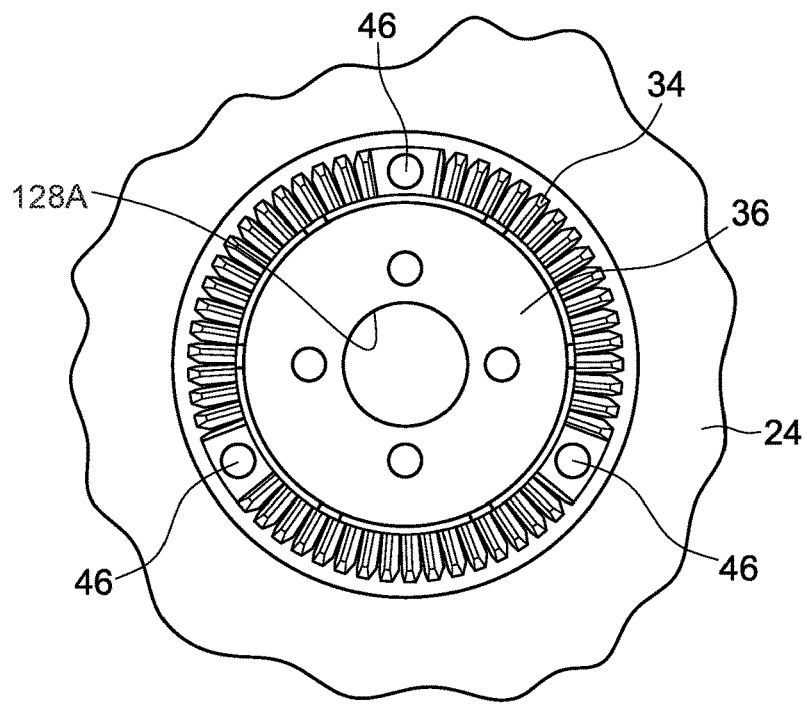
FIG. 10B is a bottom view illustrating a configuration of a reel hub of a reel according to the second exemplary embodiment.

As illustrated in FIG. 10A and FIG. 10B, the reel 120 according to the second exemplary embodiment includes a circular shaped opening portion 128A at the center portion of the bottom plate 128 (the axial center of the reel 120), and three of the gate marks 46 are formed at equal intervals on the reel gear 34 formed at the lower face of the bottom plate 128. Namely, as illustrated in FIG. 11, in the mold 160 for molding the reel component member 130 of this reel 120, three of the gates 66 are disposed at equal intervals around the circumferential direction of the bottom plate formation portion 168.

Melted resin material that is injected through the three gates 66 thereby converges together at the bottom plate formation portion 168, and also converges together at the hub formation portion 162 and the flange formation portion 64. Thus, similarly to in the first exemplary embodiment, weld portions 40 each including the weld line 42 are formed at the outer peripheral face 22A of the reel hub 22 (see FIG. 7).

Namely, in the first exemplary embodiment, the weld portions 40 are formed at the outer peripheral face 22A of the reel hub 22 by the three column portions 58 provided to the bottom plate formation portion 68 at equal intervals around the circumferential direction, whereas in the second exemplary embodiment, the weld portions 40 are formed to the outer peripheral face 22A of the reel hub 22 by disposing the three gates 66 at the bottom plate formation portion 168 at equal intervals around the circumferential direction. Thus, as illustrated in FIG. 11, it is effective to apply the anticorrosion coating CT to the wall face 62A of the hub formation portion 162 of the mold 160 in this example also.

Third Exemplary Embodiment

Explanation follows regarding a reel 220 according to a third exemplary embodiment. Note that similar locations to the first exemplary embodiment and the second exemplary embodiment are appended with the same reference numerals, and detailed explanation thereof (including common operation) is omitted as appropriate.

The reel 220 according to the third exemplary embodiment includes the reel component member 230 molded using a mold (not illustrated in the drawings) in which the anticorrosion coating CT is not applied to the wall face 62A of the hub formation portion 62. The outer peripheral face 222A of the reel hub 222 (the weld portions 40 in particular) is abraded such that the difference between the surface roughness Ra of the weld portions 40 and the surface roughness Ra of the non-weld portions 44 is 0.25 μm or less. Note that a mold 60 applied with the anticorrosion coating CT may be employed.

Explanation follows regarding an example of an abrader for abrading the outer peripheral face 222A of the reel hub 222. As illustrated in FIG. 12, the abrader includes an abrading member 54 that is configured capable of contacting and moving away from the outer peripheral face 222A of the reel hub 222. A recessed portion 55 with a circular arc shape in side view is formed at the abrading member 54. The resilient body 48 is fixed by adhesion to the recessed portion 55, and a dummy tape 56 used for abrading is fixed by adhesion to an upper face 54A of the abrading member 54, including an upper face of the resilient body 48.

The outer peripheral face 222A of the reel hub 222 is thereby abraded as described below. First, the reel 220 is set on a rotary drive gear (not illustrated in the drawings) of the abrader. Namely, the reel gear 34 of the reel 220 is enmeshed with the rotary drive gear. Note that the reel plate 36 is attracted to a magnet (not illustrated in the drawings) provided at the radial direction inside of the rotary drive gear when this is performed. The abrading member 54 is then moved, and the dummy tape 56 presses against the outer peripheral face 222A of the reel hub 222.

Namely, the dummy tape 56 that is present on top of the resilient body 48 is caused to contact the outer peripheral face 222A of the reel hub 222 with a specific pressure. The reel hub 222 is then rotated at a specific speed around an arrow A direction illustrated in FIG. 12. The outer peripheral face 222A of the reel hub 222, the weld portions 40 in particular, is thereby abraded by the dummy tape 56, thereby enabling the difference between the surface roughness Ra of the weld portions 40 and the surface roughness Ra of the non-weld portions 44 to be 0.25 μm or less.

Thus, in the winding method in which the free end portion Tf of the recording tape T is caused to make sliding-contact with and adhere to the outer peripheral face 222A of the reel hub 222 and then is wound thereon, when the recording tape T is wound around the outer peripheral face 222A of the reel hub 222, more of the abraded powder D than required can be suppressed from being generated (or configured such that substantially no abraded powder D is generated), and the step occurring due to the recording tape T being wound around can be reduced.

Note that it is preferable that at least the recessed portion 55 is formed in a curved face shape (a circular arc shape in side view) with a curvature of the outer peripheral face 222A of the reel hub 222, or less. This enables a contact surface area of the dummy tape 56 present on top of the resilient body 48 against the outer peripheral face 222A of the reel hub 222 to be well secured. This enables the outer peripheral face 222A of the reel hub 222, the weld portions 40 in particular, to be efficiently abraded.

The reels 20, 120, and 220, the methods of manufacturing the reels 20, 120, and 220, and the methods of manufacturing the reel component members 30, 130, and 230 according to each of the present exemplary embodiments have been explained above based on the drawings. However, the reels 20, 120, and 220, the methods of manufacturing the reels 20, 120, and 220 and the methods of manufacturing the reel component members 30, 130, and 230 according to each of the present exemplary embodiments are not limited to those illustrated, and the design may be modified as appropriate within a range not departing from the spirit of the present disclosure.

For example, the reel component member 30 configuring the reel 20 may be configured by the reel hub 22, the upper flange 26, and the bottom plate 28. Moreover, a configuration may be applied in which the anticorrosion coating CT is only applied to parts (locations facing the weld lines 42) of the wall face 62A of the hub formation portion 62. It is sufficient that there are plural of the hole portions 38, or the gate marks 46 and the gates 66, and the numbers thereof are not limited to the three illustrated in the drawings.

What is claimed is:

1. A reel comprising:
   a bottomed circular tube shaped hub that has an outer peripheral face for winding a recording tape around;
   a first flange that is integrally molded to one end portion of the hub;
   a second flange that is joined to another end portion of the hub;
   a plurality of hole portions that are provided at equal intervals on a ring shaped reel gear formed at a lower face of a bottom plate of the hub; and
   a gate mark that is formed at the bottom plate of the hub, further to a radial direction inside than an inner peripheral face of the hub,
   wherein a difference in surface roughness between a weld portion and a non-weld portion on the outer peripheral face of the hub is 0.25 μm or less,
   wherein the hub is formed by a resin material, the weld portion, that is a portion where a melted resin material converged when the hub was molded, is formed on the outer peripheral face of the hub, and another portion excluding the weld portion on the outer peripheral face of the hub is the non-weld portion.

2. The reel of claim 1, wherein there are three of the hole portions.

3. The reel of claim 1, wherein a free end portion of the recording tape is adhered to the outer peripheral face of the hub by making sliding-contact between the free end portion of the recording tape and the outer peripheral face of the hub without being coated with a liquid for adhering.

4. A reel comprising:
   a bottomed circular tube shaped hub that has an outer peripheral face for winding a recording tape around;
   a first flange that is integrally molded to one end portion of the hub;
   a second flange that is joined to another end portion of the hub; and
   a plurality of gate marks that are formed at equal intervals in a circumferential direction at a bottom plate of the hub, further to a radial direction inside than an inner peripheral face of the hub,
   wherein a difference in surface roughness between a weld portion and a non-weld portion on the outer peripheral face of the hub is 0.25 μm or less,
   wherein the hub is formed by a resin material, the weld portion, that is a portion where a melted resin material converged when the hub was molded, is formed on the outer peripheral face of the hub, and another portion excluding the weld portion on the outer peripheral face of the hub is the non-weld portion.

5. The reel of claim 4, wherein there are three of the gate marks.

6. The reel of claim 4, wherein a free end portion of the recording tape is adhered to the outer peripheral face of the hub by making sliding-contact between the free end portion of the recording tape and the outer peripheral face of the hub without being coated with a liquid for adhering.

* * * * *